Sept. 22, 1925.
G. W. McKEE
TESTING MACHINE FOR COCKS, FITTINGS, AND THE LIKE
Filed May 23, 1922     5 Sheets-Sheet 4
1,554,637
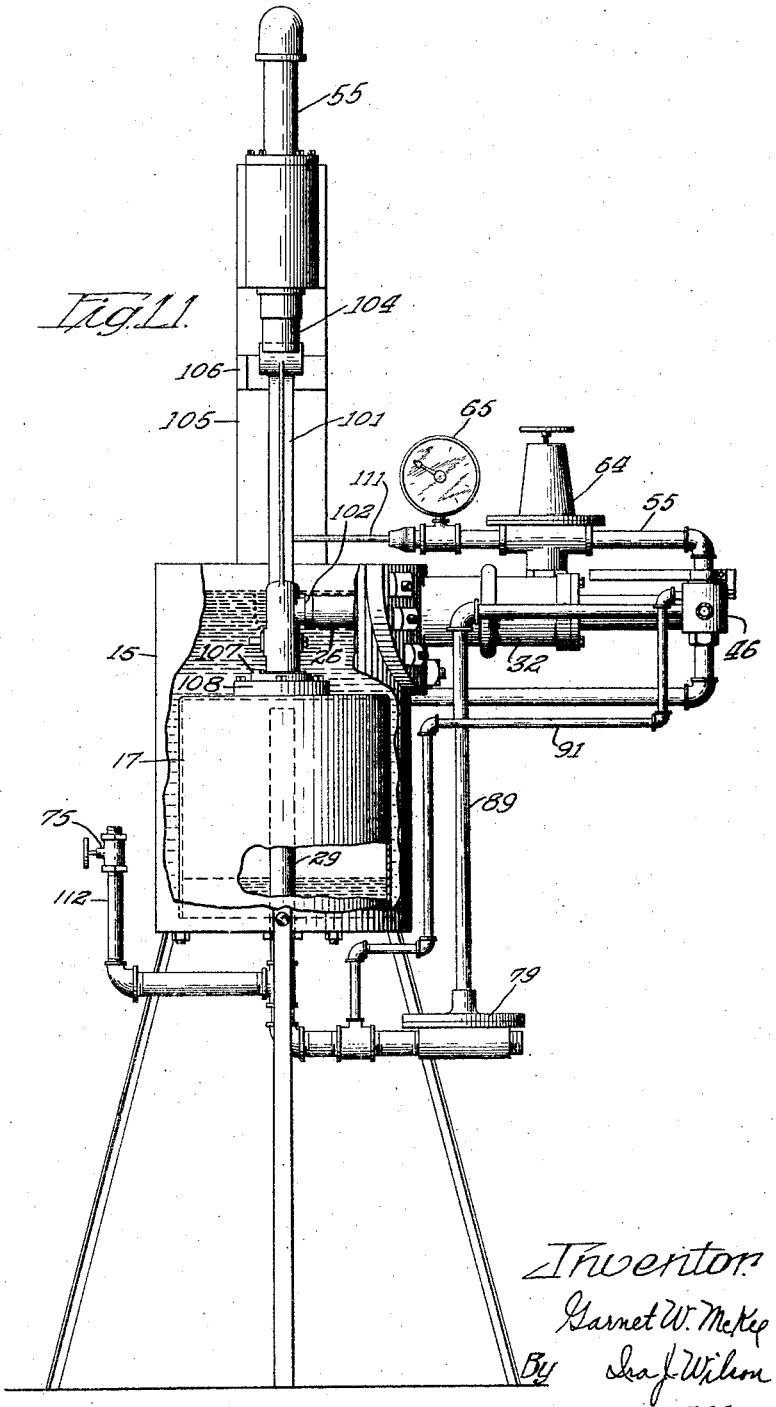

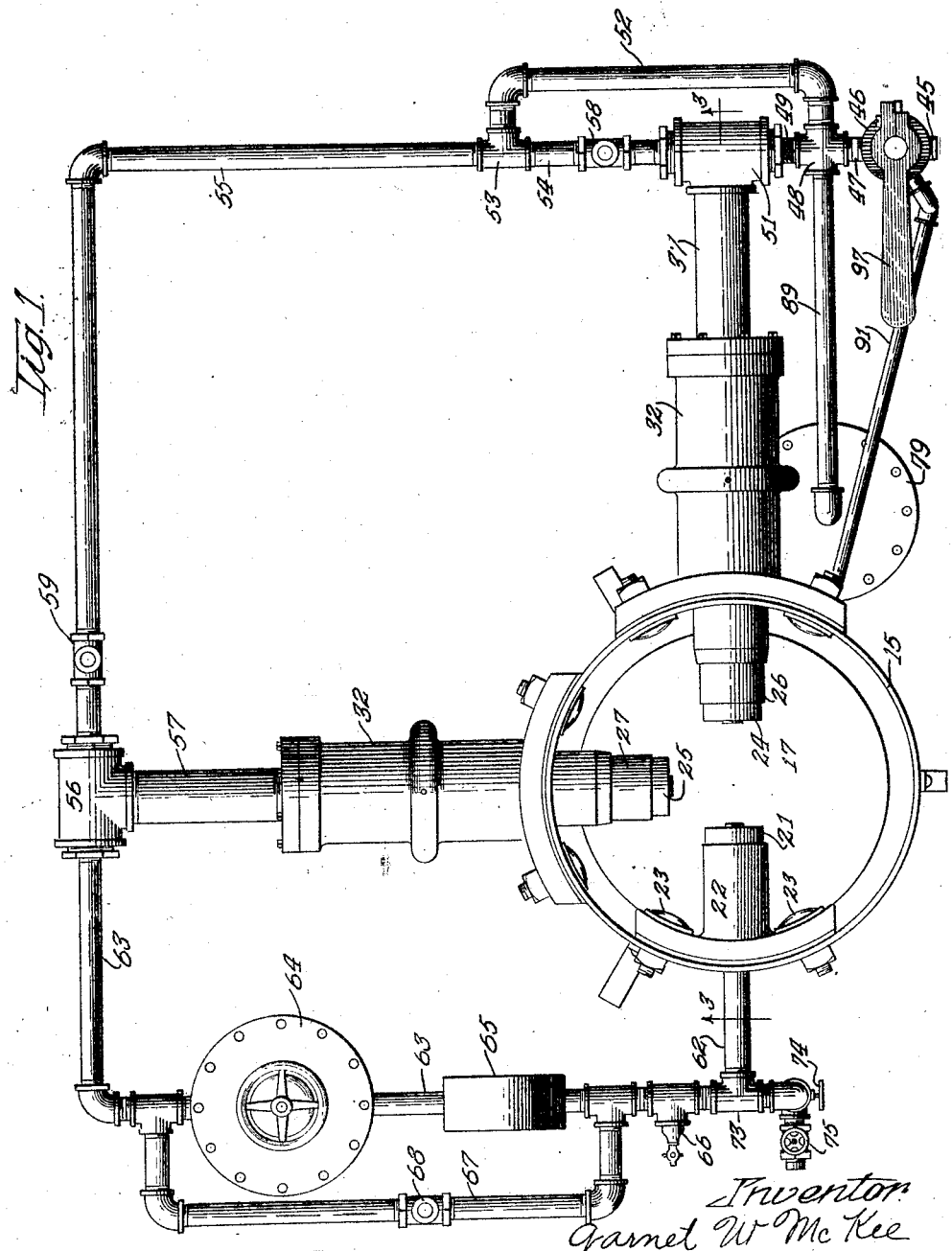

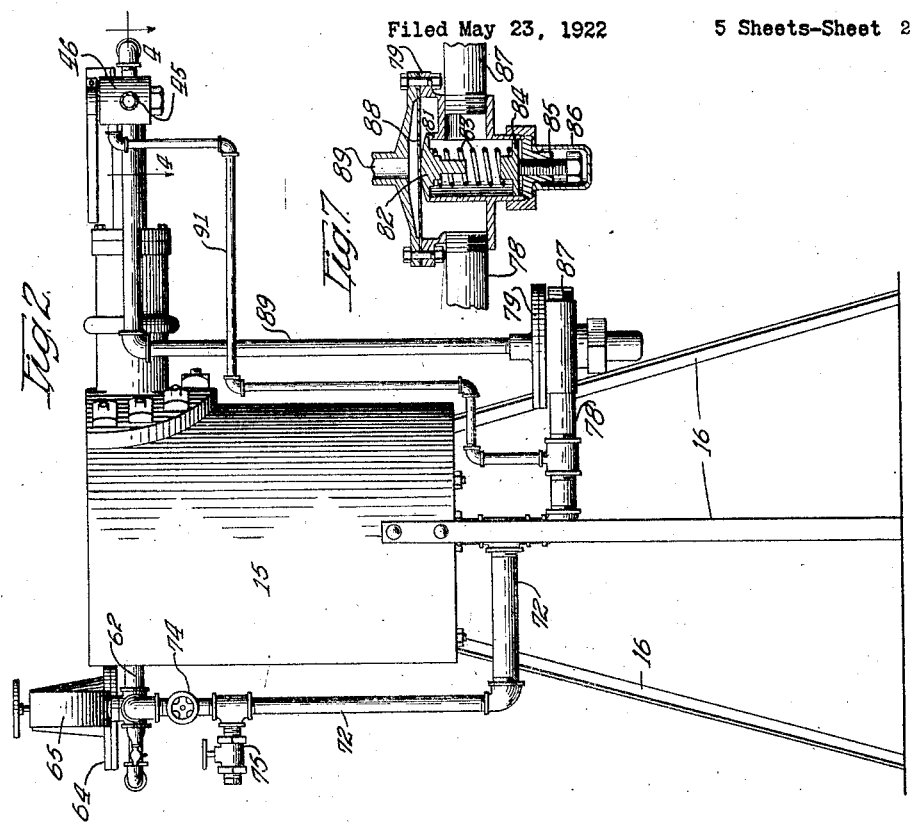

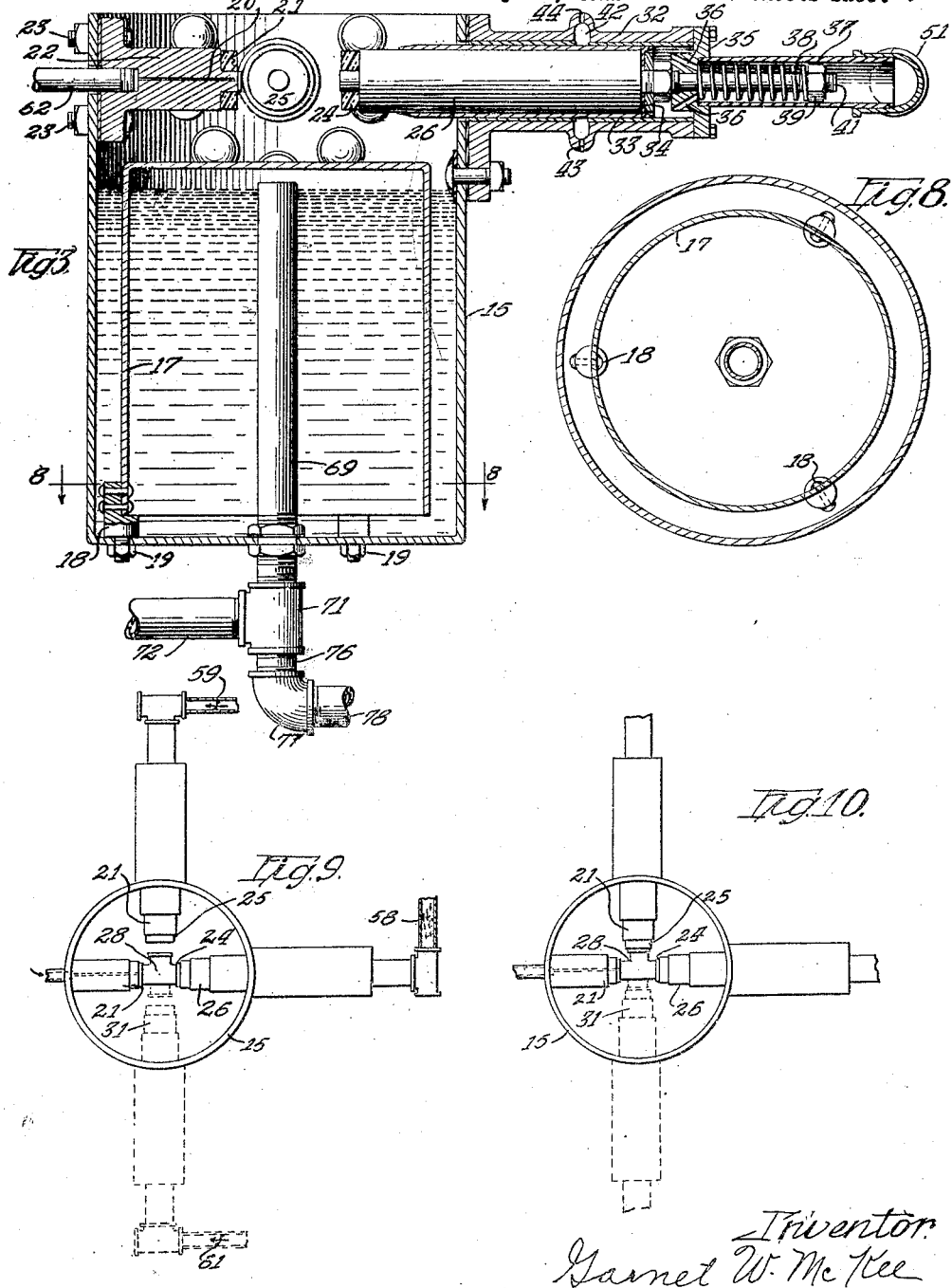

Sept. 22, 1925.
G. W. McKEE
1,554,637
TESTING MACHINE FOR COCKS, FITTINGS, AND THE LIKE
Filed May 23, 1922   5 Sheets-Sheet 5
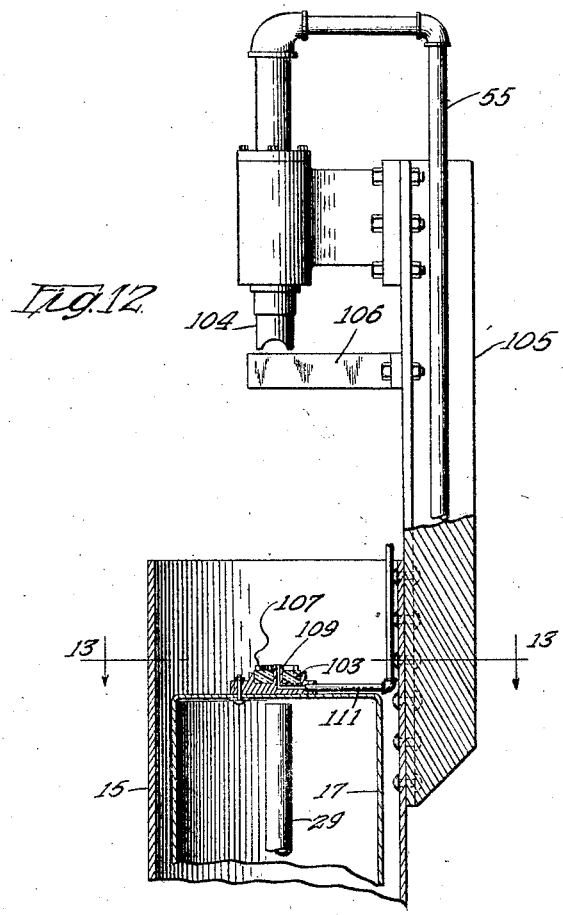
Fig.12.
Fig.13.
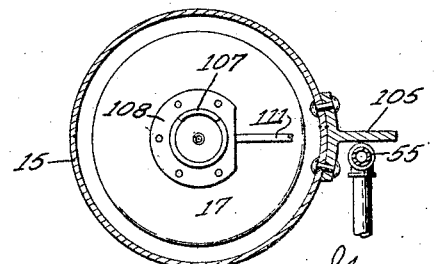
Inventor
Garnet W. McKee
Ira J. Wilson.
By
Atty.

Patented Sept. 22, 1925.

1,554,637

UNITED STATES PATENT OFFICE.

GARNET WOLESLEY McKEE, OF ROCKFORD, ILLINOIS.

TESTING MACHINE FOR COCKS, FITTINGS, AND THE LIKE.

Application filed May 23, 1922. Serial No. 563,058.

*To all whom it may concern:*

Be it known that I, GARNET W. MCKEE, a subject of the Dominion of Canada, residing at Rockford, in the county of Winnebago and State of Illinois, have invented certain new and useful Improvements in Testing Machines for Cocks, Fittings, and the like, of which the following is a specification.

Cocks, fittings of various shapes, such as Y's, T's, etc., and other apparatus designed to contain and transmit under pressure gases or other fluids, must necessarily be tested before shipment or assembly, under a pressure at least as great as the maximum pressure to which they will be subjected in use.

With one apparatus heretofore employed hydraulic pressure has been exerted upon the interior of the article to be tested, but since many of the articles are made of cast iron, the wetting of the interior causes it to rust, which is of course objectionable. Furthermore, the hydraulic test is not sufficiently reliable and satisfactory, for the reason that gas will frequently leak through minute openings through which the water under pressure would not pass in noticeable quantities during the test.

In the use of another type of apparatus, an air hose is connected to one of the openings of the article to be tested, and other openings are temporarily plugged, whereupon air under desired pressure is admitted to the interior of the article, and the article is then submerged in water in order that any air leaks may be located by the air bubbles rising therefrom through the water. The plugging and unplugging of the openings and the connection and disconnection of the air hose necessarily makes this method of testing very slow and laborious.

My present invention is designed to provide a machine, by means of which articles of the character indicated may be accurately tested with extreme rapidity, since the machine is practically automatic in its operation.

Another object is to provide a machine, in the operation of which the only manual labor required is the placing of the article to be tested in position, the manipulation of the control valve, and the removal from the machine of the tested article. The operations of closing the openings in the article and admitting air under the required pressure into the interior of the article, submerging the article in liquid so that any leaks may be observed by the air bubbles escaping therefrom, the emersion of the article from the liquid, and its release from the holding means are all performed automatically so that speed, reliability and the reduction of manual labor to a minimum are comprehended in the operation of my invention.

Without restricting my invention to the specific embodiment herein illustrated, I have shown on the accompanying drawings practical forms of the invention which at present appear preferable, and from an inspection of these drawings, when taken in connection with the following description, it is believed that the principles of my invention, and its mode and advantages of operation should be apparent.

Referring to the drawings:

Fig. 1 is a plan view of a machine embodying my invention;

Fig. 2 is a side elevation thereof, looking at the near side of the machine, shown in Fig. 1;

Fig. 3 is a sectional view on the line 3—3 of Fig. 1;

Fig. 4 is a detail sectional view through the control valve, taken on the line 4—4 of Fig. 2;

Fig. 5 is a similar view showing the valve in another position;

Fig. 6 is a sectional view on the line 6—6 of Fig. 5;

Fig. 7 is a vertical sectional view through the pressure controlled exhaust valve;

Fig. 8 is a view on the line 8—8 of Fig. 3;

Fig. 9 is a plan view somewhat diagrammatic in character illustrating the timing of the rams;

Fig. 10 is a similar view showing the rams in another position;

Fig. 11 is a side elevation, partially in section of a modified form of the invention;

Fig. 12 is a fragmentary view taken at right angles to the showing in Fig. 11; and Fig. 13 is a sectional view on the line 13—13 of Fig. 12.

Referring now to the drawings more in detail, and particularly to Figs. 1 to 10 inclusive, reference character 15 indicates an open topped receptacle of suitable size preferably made of metal and adapted to contain water or other liquid in which the articles to be tested are submerged. This receptacle may be supported at any convenient height upon a plurality of legs 16.

Within this receptacle a drum 17 is securely anchored in inverted position by means of a plurality of lugs 18 riveted to the open end of the drum and fixed, by nuts 19 threaded onto the downwardly projecting threaded portion of the studs, to the bottom of the receptacle 15, so as to leave a space between the bottom and side walls of the receptacle and the lower open end and side walls of the drum.

Above the drum, within the receptacle, there is disposed a plurality of holding devices by which the article to be tested is clamped so as to close the openings therein, and held while pressure is applied, to the interior thereof. These holding devices may vary in number and arrangements, depending upon the configuration of the particular articles to be tested, but in any event, they customarily comprise one stationary abutment adapted to close one opening in the article to be tested, and one or more movable abutments carried upon reciprocatory rams, these movable abutments being arranged and adapted to close the other openings in the article to be tested. The particular machine illustrated in Figs. 1 to 8, inclusive, is adapted for testing T-fittings, and comprises a stationary abutment 21, formed of rubber or other resilient material, carried by a boss or stud 22 which is fixedly secured by bolts 23 to a wall of the receptacle 15 into which it radially projects. In conjunction with this stationary abutment, there is provided a plurality of, in the present instance two, movable abutments 24 and 25, each adapted to close another opening of the fitting, the abutment 24 being carried by a reciprocatory ram 26 disposed in alinement with the stud 22, and the abutment 25 being carried by a similar ram 27 disposed at right angles to the axis of the stud and ram 22 and 26.

While these rams may, if preferred, be mechanically operated, they are designed in the present instance to be pneumatically actuated, and in the operation of my machine a T 28 (Fig. 9) having been positioned with one end against the abutment 21, the ram 26 is then projected toward the abutment 21 so as to clamp the ends of the T between the abutments 21 and 24. The ram 27 is then projected against the lateral opening of the T to close that opening, whereupon air under pressure is admitted to the interior of the T through the duct 29 in the stud 22 to impose the required testing pressure upon the interior of the T. Water or other liquid contained in the receptacle 15 is then caused to rise, as will be later explained, until the T is completely submerged therein so that any leaks in the T being tested may be immediately located by the bubbles rising in the liquid from the point of leakage through which the air is escaping. After the article has been tested, the liquid level in the receptacle is lowered, the rams are retracted, and the tested article is then removed and replaced by another, upon which similar operations are performed.

Should it be desirable to test cross fittings instead of T, an additional ram 31, shown in dotted lines in Fig. 9 is employed, this ram being located in alinement with the ram 27 so that alined openings in the fitting will be closed by these opposed rams. The position of the rams, when the actual test is being made, is illustrated in Fig. 10.

Since all of the rams are substantially similar in construction, a detailed explanation of one of them will suffice, and selecting ram 26 for this purpose, which is best illustrated in Fig. 3, it will be observed from an inspection of this figure that the ram is mounted to reciprocate in a cylindrical housing 32, preferably equipped with a bushing 33 of brass or other suitable material. The outer end of the ram is provided with a gasket or packing ring 34, and the head 35 of the cylinder has a plurality of ports 36 formed therein through which air under pressure is admitted from the branch 37 against the outer end of the ram to force it into operative position toward the abutment 21.

When the air pressure is relieved, the ram is returned to the normal position illustrated in Fig. 3 by a coiled expansion spring 38 interposed in the branch 37, between the cylinder head 35 and a nut 39 threaded onto the rod 41 which projects from the outer end of the ram. The tension of this spring may be regulated by adjusting the position of the nut 39. In order to prevent air which might leak past the ram from escaping into the receptacle 15, and similarly to obviate leakage of water from the receptacle back into the branch 37 and the air pipes connected thereto, the housing 32 is provided with an annular groove 42 surrounding the ram, and having at its bottom an exhaust port 43 through which water may escape, and at its top a similar port 44 through which air may escape. Leakage of either air or water completely past the ram in either direction is thereby obviated.

The air for operating the rams is supplied under pressure from any suitable source through a main supply pipe 45 to a control valve casing 46 from whence it is delivered to the required points of use under the control of this valve, the structure of which will be later explained. It will suffice for the present to state that from this control valve the air is delivered through a nipple 47 into a fitting 48 which in the present instance is in the form of a cross, although a T might be employed, since the connection 49 is plugged and merely serves to support the fitting 48 from the rigidly mounted T 51. From this fitting 48 the air flows through a by-pass pipe 52 into the T 53, one side of which is connected by a pipe 54 with the T 51, to which the branch 37 is connected. The air entering through this branch actuates the ram 26. A pipe 55 also connected with the T 53 conducts the air to a T 56 which communicates through a branch 57 with the housing 32 in which the ram 27 is mounted, this ram being operated similarly to ram 26, which has previously been explained in detail.

It will be obvious that the ram 26 should be projected so as to clamp the fitting snugly between the abutments 21 and 24 before the ram 27 is projected, or otherwise the ram 27 would force the fitting laterally from between the abutments 21 and 24. The actuations of the rams 26 and 27 are for this reason so timed that the projection of ram 27 is delayed until ram 26 is fully projected to so firmly clamp the fitting to be tested that it will not be displaced under the pressure exerted by the ram 27, and while any timing apparatus suitable for accomplishing this result may be employed, I have shown in the present instance a simple arrangement for accomplishing this purpose, which consists of two check valves 58 and 59 interposed respectively in the pipes 54 and 55. Check valve 58 opens under pressure of the air flowing to the ram 26 so that this ram will be quickly actuated upon the admission of the air pressure. Check valve 59, however, opens toward the source of air supply and closes when the air is admitted through the pipe 55 from the control valve 46. Each valve, however, is provided with a bleed opening of sufficient size to permit the requisite flow of air therethrough, but serves to check or retard the flow so that the actuation of the ram 27 is delayed until sufficient time has elapsed to permit ram 26 to firmly clamp the fitting to be tested, between the abutments 21 and 24. The valves 58 and 59 are illustrated rather diametrically in Fig. 9, from which it will be observed that air pressure being exerted against them from the source of air pressure supply, valve 58 is opened permitting an unrestrained flow of air to ram 26, while valve 59 is closed, permitting a restricted flow to ram 27. If an additional ram 31 is employed, its air supply is similarly controlled by a valve 61 which times the movements of the ram 31 so that its actuations are substantially simultaneous with the movements of ram 27. Upon reverse flow of air from the rams when the air is permitted to exhaust, as will be later explained, valve 59 opens, permitting the immediate retraction of ram 27, while valve 58 closes, retarding thereby the retraction of ram 26, so that sufficient time is afforded for the operator to grasp the fitting preparatory to removing it from the machine, before it is entirely released.

The air under pressure delivered to the interior of the fitting to be tested through the duct 29 is supplied to this duct through a branch 62, connected with a supply pipe 63, which in turn, is connected with the fitting 56 from which the air under pressure is received. In order to reduce the air delivered to the interior of the fitting, to the required testing pressure, a pressure regulator 64 of any preferred type is interposed in the pipe 63, and beyond this regulator a pressure gage 65 is interposed in the pipe from which the operator may ascertain the pressure being delivered. In case of the failure of the pressure regulator to properly reduce the pressure, the pressure may be temporarily reduced by a manually-controlled emergency cock 66 which, if partially opened, will release some of the pressure so that only the requisite pressure will be delivered into the article to be tested. Since the pressure regulator will only permit a flow of air in one direction, the exhaust or return flow is conducted around the regulator through a by-pass 67 which is equipped with a check valve 68 so that no air may flow inwardly around the regulator, but all exhaust air flowing outwardly will be by-passed around the regulator.

The water or other immersing liquid normally stands in the receptacle 15 and drum 17 at substantially the height shown in Fig. 3 and this liquid is caused to rise in the receptacle so as to submerge the article being tested, by delivering air under pressure into the upper end of the drum so as to depress the liquid level in the drum and thereby raise the level in the receptacle. For this purpose an air supply pipe 69 projects upwardly from the bottom of the receptacle to a point above the normal liquid level in the drum. A T 71 attached to this pipe below the bottom of the receptacle is connected by a pipe 72 with a T 73 (Fig. 1) through which communication is established between the pipes 62 and 63. A hand-controlled valve 74 is interposed in the pipe 72, and a hand-controlled exhaust valve 75 is also interposed in this pipe. By closing the valve 75 and opening valve 74, air under pressure may be admitted to the interior of the drum through the pipe 69 so as to depress the liquid level in the drum, thereby causing a rise in the liquid level in the receptacle sufficiently to submerge the article being tested. When the desired height of liquid in the receptacle has been attained, valve 74 may be shut off and the liquid level will be maintained at this height as long as desirable, whereupon, by opening the exhaust valve 75 the air under pressure in the drum may be exhausted to atmosphere, permitting the liquid to assume its normal level. While the liquid level may be manually controlled by manipulating the valve 74 and 75, as just explained, this form of control is intended merely for emergency purposes, or as an auxiliary to an automatic liquid level control, which will now be described.

To the lower end of the T 71 there is connected by a nipple 76 and an elbow 77, a pipe 78, which communicates at its outer end with a pressure controlled exhaust valve indicated generally by reference character 79, (Fig. 7). This valve comprises a seat 81 against which a valve proper 82 seats to close the valve. An expansion spring 83 interposed between the valve and an adjustable disc 84 normally tends to lift the valve off its seat. Tension of this spring may be regulated by manipulation of an adjusting screw 85 which is normally protected against accidental movement by a removable protecting cap 86. The valve casing communicates on the opposite side of the seat from the pipe 78, directly with the atmosphere through an exhaust pipe 87. Immediately above the valve 82 there is disposed a flexible diaphragm 88, the upper face of which is exposed to air under pressure delivered from the cross 48 through a connecting pipe 89. When, therefore, air under pressure is admitted from the control valve to the cross, the pressure thereof will be exerted through the pipe 89 upon the diaphragm 88 to hold the valve 82 against its seat and thereby prevent the escape of air to atmosphere from the pipe 78.

The control valve is so constructed, as will be later explained, that when air is admitted through the valve through the cross 48, air will also be delivered through a connecting pipe 91 to the pipe 78, and since at this time the valve 82 is held against its seat by air pressure, the air admitted through pipe 91 will be delivered through pipe 69 into the upper end of drum 17, thereby causing a rise of the liquid level in the receptacle to submerge the article being tested. In normal operation of the apparatus, the valves 74 and 75 are both maintained in closed position; although the liquid level may be further raised or lowered by manipulation of these valves.

The control valve casing 46 has communicating therewith, as will be apparent from the drawings and particularly Figs. 4 and 5, the air supply pipe 45, the nipple 47 communicating with the cross 48, and the pipe 91 through which air is supplied to the interior of the drum 17. This casing is also provided with a radially disposed exhaust port 92. Within the casing there is disposed a rotatable turning plug 93 provided with a diametral passage 94 disposed at the same height as pipes 45 and 47 and the exhaust port 92, and a passage 95 communicating with the passage 94 at its lower end and extending upwardly sufficiently to also communicate with pipe 91 through the port 96 when the plug is disposed in the position shown in Figs. 5 and 6. The upper end of the plug is provided with a control handle 97, by means of which the valve may be manipulated.

In the operation of my apparatus, the parts are normally in the position shown in Fig. 1, with the rams retracted, the control valve being positioned as shown in Fig. 4, permitting air to exhaust from the various devices supplied through the nipple 47, the air from the interior of the drum being exhausted through the now open exhaust valve 79, since no pressure is exerted upon the upper face of the diaphragm 88 through the pipe 89.

The article to be tested having been placed in position against the abutment 21 as previously explained, the handle 97 of the control valve is now swung in a counter-clockwise direction, viewing Fig. 1, to dispose the valve in the position shown in Fig. 5, permitting air under pressure to be delivered to the cross 48 through the nipple 47 and also causing air under pressure to be delivered through the passage 95, pipe 91 and pipe 69 into the drum to raise the liquid level in the receptacle. The restricted port 96, however, delays the elevation of the liquid level in the receptacle until after the rams 26 and 27 have been actuated to close the openings in the article to be tested and firmly clamp the same in position. The control valve is held in the position shown in Fig. 5 until the article to be tested is completely submerged, whereupon a slight movement of the handle in a clockwise direction is effected to shut off further supply of air to the pipe 91. Air being admitted under pressure to the interior of the article to be tested through the duct 29, as previously explained, the operator may now detect the presence and location of any leak in the article by air which may escape therefrom and bubble up through the liquid. After the test has been completed, the control valve is rotated to the exhaust position shown in Fig. 4, thereby permitting air to exhaust through the pipe 89 from above the diaphragm 88, so that the valve 82 will open to permit the speedy exhaust of air from the drum 17, and immediately thereafter the rams 27 and 26 will be retracted in succession to free the tested article for removal and replacement by another. The timing of the movements of the rams is controlled by the apertured check valves 58 and 59, as previously explained, and the pressure exerted upon the interior of the article being tested is controlled by the regulator 64 around which the air is permitted to exhaust, after the test has been completed, through the by-pass pipe 67. Excessive pressure resulting from improper operation of the regulator 64 may be relieved through the cock 66, and the liquid level in the receptacle may be caused to rise or fall, as desired, by manipulation of the valves 74 and 75.

In Figs. 11 to 13 inclusive, I have illustrated an apparatus embodying in all essential details the structure previously described, but this machine is adapted for testing a different type of fitting, which is indicated by reference character 101 in Fig. 11. This fitting has a solid upper portion and a hollow lower end having a lateral hollow boss 102 which is adapted to be closed by the ram 26, the lower open end of the fitting being adapted to seat against the abutment 103, which in this instance is placed horizontally instead of vertically, as was the abutment 21 previously described. The ram 104 in this instance is disposed practically in alinement with the abutment 103 and is carried upon a suitable standard 105. A bracket 106 serves as an aid in properly positioning the fitting.

Timing valves are employed which causes ram 104 to be depressed first so as to firmly clamp the fitting against abutment 103, whereupon ram 26 is actuated to close the boss 102. In order to prevent lateral displacement of the fitting, relatively to the abutment 103, an arcuate rib or flange 107 is carried by the seat 108, in which the abutment 103 is mounted. The air in this instance is admitted to the interior of the fitting through a duct 109 extending through the abutment 103 and supplied with air through a pipe 111 equipped with the pressure gage 65 and pressure regulator 64, all as previously explained. In this particular machine, I have omitted the auxiliary air supply valve 74, but have equipped a pipe 112 connected with the drum supply pipe 29, with an exhaust valve 75.

It is believed that further detailed explanation of this form of the invention will be unnecessary, and it should be obvious that the rams and abutments by which the article to be tested is clamped and held may be disposed in various positions, and the timing of the actuation of the rams may be varied to adapt the machine to any form of article which it may be desirable to test. Obviously, also, other structural details of the invention may be varied within wide limits without departing from the essence of the invention as defined in the following claims.

I claim:

1. In a testing machine, the combination of a liquid receptacle, a stationary abutment within the receptacle, a movable ram cooperating therewith to clamp and hold an article to be tested, means for causing a rise and fall of the liquid level in said receptacle, and pneumatic means put into operation by a single control device for operating said ram and causing the liquid to rise and fall in timed relation.

2. In a testing machine, the combination of a liquid receptacle, means for sealing the openings in an article to be tested and holding said article in fixed position in said receptacle, and means automatically operated in timed relation with the first named means for varying the liquid level in said receptacle.

3. In a testing machine, the combination of a liquid receptacle, an inverted drum disposed therein, means for holding an article to be tested in position within the receptacle above said drum, and means for delivering air under pressure into said drum to displace the liquid therein and cause a rise of liquid in the receptacle around said article.

4. In a testing machine, the combination of a liquid receptacle, means for stationarily holding an article to be tested in the upper portion of said receptacle, and pneumatic means, including an inverted drum, for causing the immersion of said article in the liquid in the receptacle.

5. In a testing machine, the combination of a liquid receptacle, an inverted drum disposed therein, an air supply pipe extending into said drum, and means for supplying air under pressure through said pipe to raise the liquid level in said receptacle.

6. In a testing machine, the combination of a liquid receptacle, a hollow boss mounted therein, a stationary abutment carried by said boss, a movable yielding abutment opposed to said stationary abutment, means for actuating said movable abutment to clamp an article to be tested between said abutments, means for supplying air to the interior of said article through said hollow boss, and pneumatic means for submerging said article in liquid.

7. In a testing machine the combination of a liquid receptacle, means for causing liquid therein to alternately rise and fall, article holding and clamping mechanism comprising a stationary abutment and a plurality of movable abutments, means for moving said movable abutments successively into clamping position, and means for supplying air under pressure to the interior of said article.

8. In a testing machine, the combination of a stationary abutment, a movable ram opposed thereto, pneumatic means for projecting said ram toward said abutment, means for delivering air under pressure through said stationary abutment, means for immersing in liquid an article clamped between said abutments, and control mechanism for causing said ram, air delivery means and immersing means to be operated automatically in predetermined sequence.

9. In a testing machine, the combination of a stationary hollow abutment, a movable abutment cooperating therewith, an air supply pipe connected with said stationary abutment, a pressure regulator interposed in said pipe, a by-pass pipe around said regulator, and a check valve in said by-pass pipe.

10. In a testing machine, the combination of means for clamping and holding an article to be tested, a pipe for delivering air under pressure to the interior of said article, a pressure regulator interposed in said pipe, a by-pass pipe around said regulator, a check valve in said pipe, and a manually operable control valve for admitting air to and exhausting the same from said pipe.

11. In a testing machine, the combination of a stationary abutment, a plurality of movable abutments, pneumatic means for projecting said movable abutments toward the stationary abutment, and means for causing said movable abutments to be actuated in predetermined timed succession.

12. In a testing machine, the combination of a stationary abutment, a plurality of reciprocatory clamping rams, and means for so actuating said rams that one will be projected in advance of the other into operative relation with respect to said abutment and retracted in reverse order.

13. In a testing machine, the combination of a plurality of reciprocatory rams, air pressure actuated means for projecting said rams, timing mechanism for causing the projecting and retraction of said rams in predetermined order and a stationary abutment with which said rams cooperate.

14. A testing machine, comprising a plurality of reciprocatory rams, pneumatically actuated means for projecting said rams, means for supplying air under pressure to said projecting means, timing mechanism comprising apertured check valves controlling the flow of air to and from said pneumatic means to thereby cause the same to be actuated in predetermined timed relation and a cooperating stationary abutment.

15. In a testing machine, the combination of a liquid receptacle, a reciprocatory ram projecting into said receptacle, means for causing liquid in the receptacle to rise above said ram, pneumatic means for actuating said ram, and means for preventing leakage past said ram from one end to the other thereof.

16. A testing machine, comprising a liquid receptacle, a cylinder mounted on one side thereof, a reciprocatory ram projecting from said cylinder into the receptacle, a piston at the outer end of the ram, means for supplying air under pressure from said cylinder to actuate the piston, and a spring for retracting the ram, said cylinder being provided intermediate its ends with an internal groove provided with a plurality of ports through which leakage past the ram will be delivered.

17. In a testing machine, the combination of a liquid receptacle, an inverted drum therein, an air supply pipe delivering into said drum, means for supplying air under pressure to said pipe, and a pressure controlled exhaust valve through which the air may be quickly exhausted from said drum.

18. In a testing machine, the combination of a liquid receptacle, an inverted drum therein, an air supply pipe delivering into said drum, means for supplying air under pressure to said pipe, a pressure controlled exhaust valve connected with said pipe, and manually controlled means for closing said valve and admitting pressure to said pipe.

19. In a testing machine, the combination of a liquid level regulating device, including an inverted drum, an air pipe extending into said drum, a manually operable control valve, means for supplying air from said valve to said pipe, an exhaust valve connected with said pipe, and means for supplying air from said control valve to said exhaust valve to maintain the same in closed position.

20. In a testing machine, the combination of a liquid receptacle, an inverted drum therein, a pipe extending into said drum, means for supplying air under pressure to said pipe, an automatically controlled exhaust valve connected with said pipe, and a manually controlled auxiliary exhaust valve connected with said pipe.

21. In a testing machine, the combination of a liquid receptacle, an inverted drum therein, a pipe communicating with the interior of said drum above the normal liquid level, an automatically operated exhaust valve connected with said pipe, means for closing said valve and admitting air under pressure to said pipe, an auxiliary manually controlled air supply valve connected with said pipe, and an auxiliary manually controlled exhaust valve also connected with said pipe.

22. In a testing machine, the combination of a liquid receptacle, pneumatic means for causing an alternate rise and fall of the liquid level in said receptacle, pneumatically operated means for clamping an article in position to be tested, means for supplying air under pressure to the interior of said article, and a single control valve whereby all of said means are controlled.

23. In a testing machine, the combination of opposed abutments for clamping an interposed article, an additional abutment for clamping said article, means for imposing pressure on the interior of the article, and control mechanism for automatically operating said opposed article clamping abutments, said additional abutment, and said pressure imposing means, in timed sequence.

24. In a testing machine, the combination of pneumatically operated means for clamping an article, means for imposing air pressure on the interior of the clamped article, and an air supply for operating said article-clamping means and for imposing said pressure, including means for regulating the pressure in the article.

25. In a testing machine, the combination of pneumatically operated means for clamping an article, means for imposing air pressure on the interior of the article, pneumatically operated means for immersing the article, a source of air supply, and control mechanism for causing the aforementioned means to be operated automatically by air from said supply, in predetermined sequence.

26. In a testing machine of the character described, the combination of opposed abutments between which an article to be tested is adapted to be clamped for holding it and closing its opposed open ends, a third abutment in angular relation to the opposed abutments for closing an intermediate opening in the article, means for imposing pressure on the interior of said article, and means adapted to be put into operation by an operator for clamping the article by said opposed abutments and for automatically subsequently clamping the article by said angular abutment.

27. In a testing machine of the character described, the combination set forth in claim 26 in which the last mentioned means when put into operation by the operator after testing, releases said angular abutment and automatically subsequently releases said opposed abutments.

28. In a testing machine, the combination of article holding and clamping mechanism comprising a stationary abutment, a plurality of movable abutments and means for operating the movable abutments to clamp the article at successive predetermined intervals, and means for imposing pressure on the interior of said article.

29. In a testing machine, the combination of article holding and clamping mechanism comprising a pair of opposed abutments adapted for clamping an interposed article, an additional abutment for clamping the article, and means for causing the article to be automatically clamped by said opposed abutments and said additional abutment in succession.

30. In a testing machine, the combination of article holding and clamping mechanism comprising a pair of opposed abutments adapted for clamping an interposed article, an additional abutment for clamping the article and moving in a plane angular with respect to the plane of compression of said opposed abutments, and means for causing the article to be automatically clamped by said opposed abutments and said additional abutment in succession.

31. In a testing machine of the character described, the combination of holding means for closing the openings in an article to be tested and subsequently releasing it, means for admitting air under pressure into the interior of the article, means for submerging the article in liquid so that any leaks may be observed by the air bubbles escaping therefrom, means for effecting emersion of the article from the liquid, and means for automatically operating the aforementioned means in predetermined succession.

32. In a testing machine of the character described, the combination of holding means for closing the openings in an article to be tested and subsequently releasing it, means for admitting air under pressure into the interior of the article, means for submerging the article in liquid so that any leaks may be observed by the air bubbles escaping therefrom, means for effecting emersion of the article from the liquid, and means put into operation by a single control device for automatically operating the aforementioned means in predetermined succession.

GARNET WOLESLEY McKEE.